United States Patent [19]

Ishiguro et al.

[11] Patent Number: 4,836,742

[45] Date of Patent: Jun. 6, 1989

[54] SYSTEM FOR CONTROLLING A ROBOT IN ASSOCIATION WITH A ROTARY TABLE

[75] Inventors: Yasuo Ishiguro; Yoshizumi Itou, both of Toyota; Osamu Shiroshita, Aichi; Masaru Nakano, Nagoya, all of Japan

[73] Assignees: Toyota Jidosha Kabushiki Kaisha; Kabushiki Kaisha Toyota Chuo Kenkyusho, both of Japan

[21] Appl. No.: 59,227

[22] Filed: Jun. 5, 1987

Related U.S. Application Data

[63] Continuation of Ser. No. 710,222, Mar. 11, 1985, abandoned.

[30] Foreign Application Priority Data

Mar. 14, 1984 [JP] Japan .................. 59-47179

[51] Int. Cl.$^4$ .................................. B66C 23/00
[52] U.S. Cl. .................................. 414/742; 414/730; 901/4; 901/6; 901/15
[58] Field of Search .......... 901/4, 6, 9, 15, 41, 901/43; 414/730, 735, 742; 318/568; 364/167-171, 191-193, 474

[56] References Cited

U.S. PATENT DOCUMENTS

| | | | |
|---|---|---|---|
| 3,920,972 | 11/1975 | Corwin, Jr. et al. | 901/15 X |
| 3,951,273 | 4/1976 | deCaussin | 901/6 X |
| 4,420,812 | 12/1983 | Ito et al. | 901/15 X |
| 4,495,453 | 1/1985 | Inaba et al. | |
| 4,541,062 | 9/1985 | Kada et al. | 901/6 X |
| 4,598,380 | 7/1986 | Holmes et al. | 901/20 X |
| 4,664,570 | 5/1987 | Tsukiji et al. | 364/474 X |
| 4,665,493 | 5/1987 | Hattori | 364/167 X |
| 4,706,004 | 11/1987 | Komatsu et al. | 901/4 X |
| 4,712,183 | 12/1987 | Shiroshita et al. | |
| 4,724,371 | 2/1988 | Ito et al. | |

FOREIGN PATENT DOCUMENTS

| | | |
|---|---|---|
| 0068768 | 5/1983 | European Pat. Off. |
| 0120677 | 3/1984 | European Pat. Off. |
| 2458363 | 2/1981 | France . |
| 55-61810 | 5/1980 | Japan . |
| 56-059306 | 5/1981 | Japan . |
| 56-82192 | 7/1981 | Japan . |
| 57-15688 | 1/1982 | Japan . |
| 57-083390 | 5/1982 | Japan . |
| 58-156367 | 9/1983 | Japan . |

OTHER PUBLICATIONS

Computer, vol. 15, No. 6, Jun. 1982, pp. 8-23, USA, R. A. Jarvis: "A Computer Vision and Robotins Laboratory".

Primary Examiner—Robert J. Spar
Assistant Examiner—William M. Hienz
Attorney, Agent, or Firm—Parkhurst, Oliff & Berridge

[57] ABSTRACT

A system is provided for controling a robot operating in association with a rotary table, including a robot, a rotary table, and a control circuit. The control circuit carries out a step of composing and storing teaching data as values on a rotary table orthogonal coordinate system (UVW axes), the rotational shaft of the rotary table being the vertical (W) axis, a step of calculating the UVW coordinates of a plurality of interpolation points by carrying out path interpolation along a line and/or curve defined by the stored teaching data, a step of calculating the degree of rotation of the rotary table which is required to bring each of the interpolation points into the U-W plane, a step of computing the UVW coordinates of the positions that the interpolation points occupy as they pass through the U-W plane, a step of transforming the data obtained by the computing step from coordinates in the UVW coordinate system to coordinates in a robot assigned coordinate system (XYZ axes) or orientation positions of the joint axes of the robot, and operating the robot in accordance with the information thus derived.

11 Claims, 6 Drawing Sheets

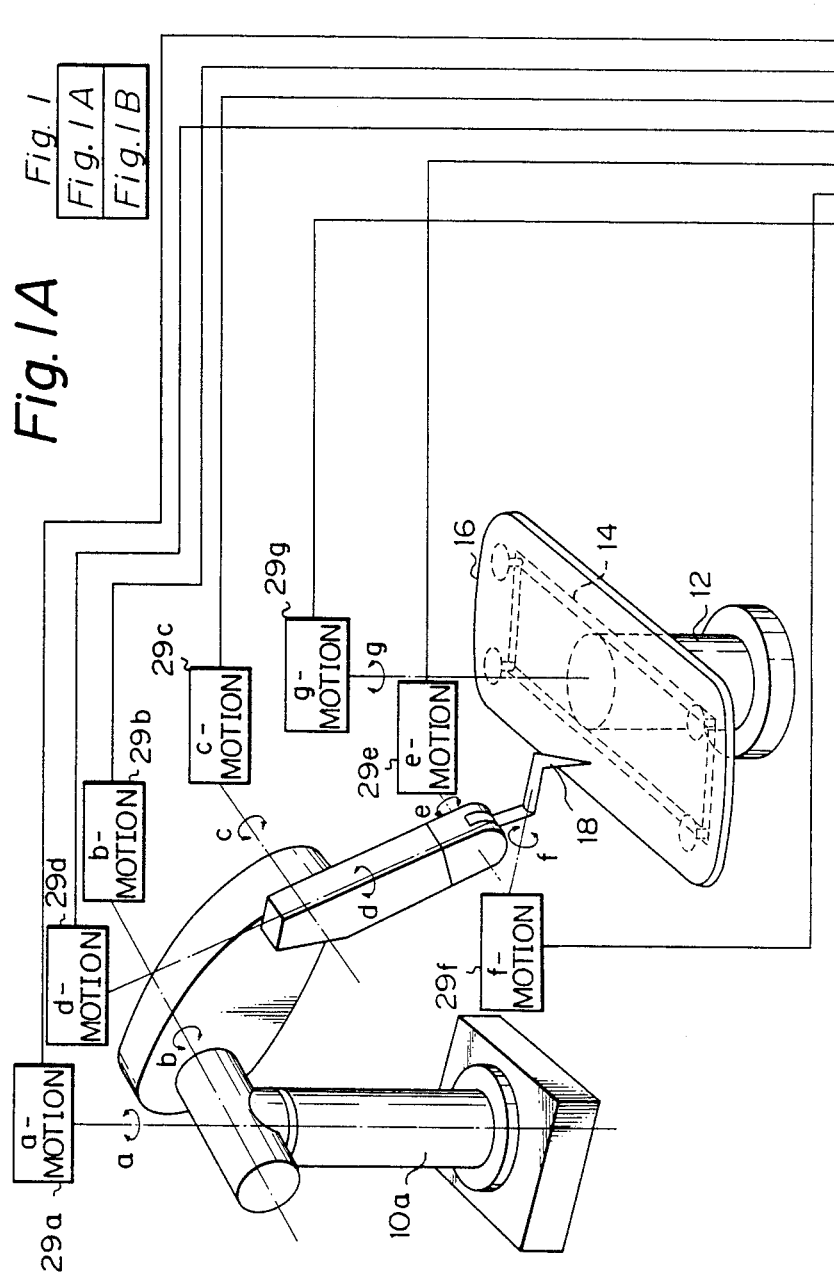

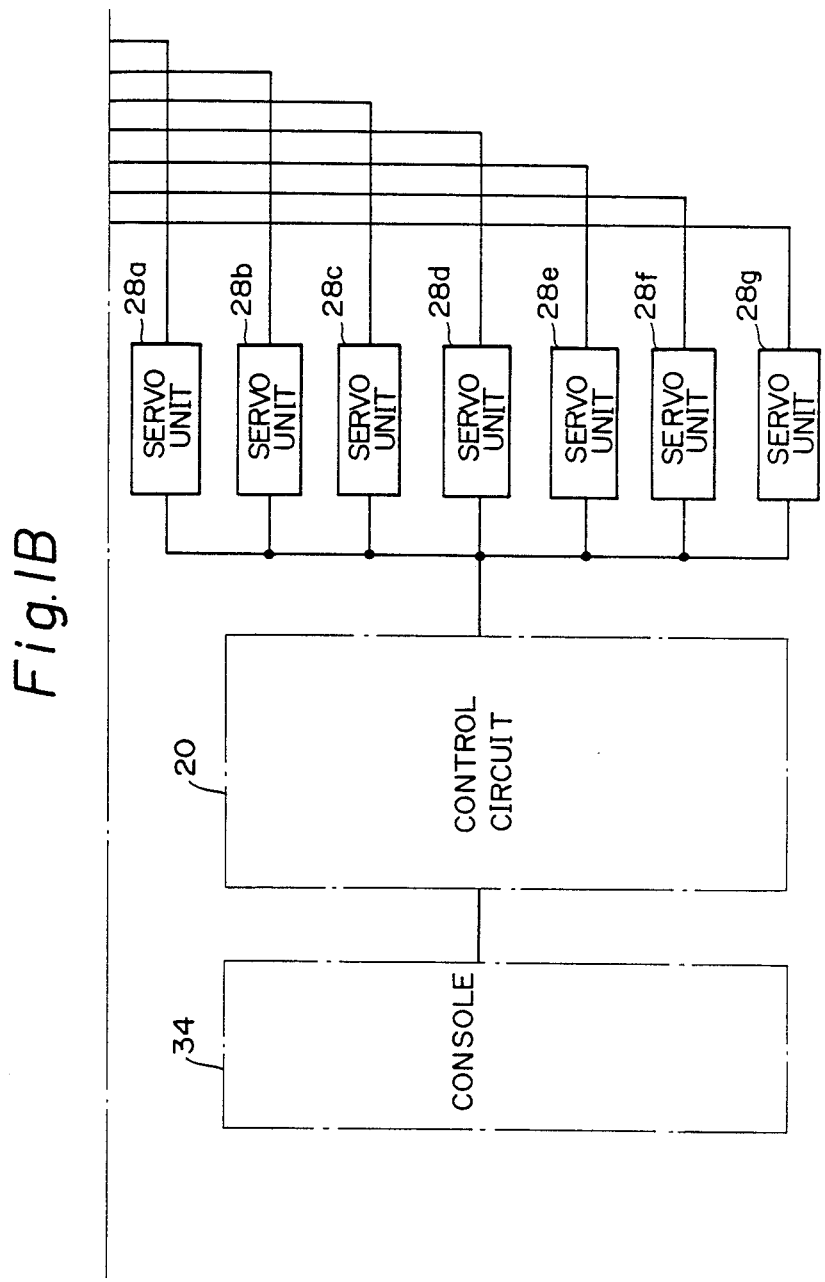

SYSTEM FOR CONTROLLING A ROBOT IN ASSOCIATION WITH A ROTARY TABLE

This is a continuation of application Ser. No. 710,222 filed Mar. 11, 1985, now abandoned.

BACKGROUND OF THE INVENTION

1. Field of the Invention

The present invention relates to a system for controlling an industrial robot in association with a rotary table.

2. Description of the Related Art

In the prior art, there is already known an industrial robot which is operated in association with a rotary table mounted with a workpiece. This simplifies the movement on the robot side, speeds up the work, and enables greater compactness. Sometimes, a transfer means is annexed to either the robot or the rotary table.

In such a conventional robot apparatus, the robot or rotary table itself is mounted on the transfer shaft of the traveling means. That is to say, a very heavy article is moved. As a result, the transfer shaft and traveling means become large in scale and it is difficult to ensure precision. Further, a large space is necessary for the operation of the traveling means along the transfer shaft. Still further, there are limitations on the disposition of the transfer shaft and the need for adjustment of the positional relation with peripheral equipment.

In another prior art robot apparatus, teaching data is stored in the form of values on a specific coordinate system (absolute coordinate system) of the robot or in the form of displacement (angles) on each axis of the robot. When this teaching data is used for playback, the interpolative calculations carried out in consideration of the relative movement between the robot and rotary table becomes much more complicated and the overall computation time becomes longer. It is not possible to reduce the interpolation time, so there is a problem of reduced precision of the path. Moreover, there is the disadvantage that the data representing the shape of each workpiece varies with the position of the workpiece with teaching data of the absolute coordinate system. There is a further disadvantage that, when the relative position between the rotary table and the robot is changed due to a change in the position of installation of the robot or the rotary table, the teaching data becomes inaccurate and must be revised.

SUMMARY OF THE INVENTION

The present invention intends to solve the abovementioned problems in the prior art.

It is an object of the invention to provide a system for controlling a robot in association with a rotary table wherein the operation time can be shortened and control may be carried out with high precision.

In accordance with the present invention, there is provided a system for controlling a robot operating in association with a rotary table, the system including a plural-axis-articulated robot having a hand portion or end effector adapted to carry out an operation in at least two dimensions, a rotary table adapted to rotate in synchronization with the operation of the robot and to support a workpiece, and a control circuit.

The robots typically include a base, a plurality of arm members and a hand portion, the respective elements connected at joints at which the members can move rotationally with respect to one another about respective joint axes. The phrase "joint angles" is used to denote the rotational orientations about the various joint axes, i.e., the "joint angles" define the orientation of the robot and thus, e.g., the position of the hand portion of the robot.

Reference is made herein to two sets of orthogonal coordinate axes (XYZ) and (UVW). The XYZ orthogonal coordinate system, also referred to as the robot assigned coordinate system, is a set of axes used to designate positions relative to the robot. The UVW orthogonal coordinate system is defined such that the axis of rotation of the rotary table is on the W axis. In the case of a system which includes a robot having an end effector which is capable of movement in only two dimensions, the U axis is defined such that the end effector moves in the U-W plane.

In accordance with the present invention, the control circuit is capable of storing a plurality of points as teaching data points and controlling operation of the robot and the rotary table. The control circuit stores teaching data points as values on the rotary table orthogonal coordinate system (UVW axes), and calculates interpolation points by defining an interpolation line segment having as endpoints stored teaching data points and calculating the coordinates, in the UVW coordinate system, of a plurality of interpolation points located on and equally spaced along the interpolation line segment.

The control circuit further carries out a step of determining an interpolation angle for each interpolation point, the interpolation angle for an interpolation point being the angle by which the rotary table must rotate to bring that interpolation point into the U-W plane; a step of computing the coordinates, in the UVW coordinate system, of U-W plane interpolation positions, the U-W plane interpolation positions comprising the UVW coordinates of the positions the interpolation points will occupy after rotation of the rotary table by the corresponding interpolation angle, i.e., when the interpolation point passes through the U-W plane; a step of transforming coordinates in the UVW coordinate system into coordinates in the XYZ coordinate system; and a step of operating said robot, i.e., controlling the rotation at each of the rotational joints, in accordance with the information thus derived.

BRIEF DESCRIPTION OF THE DRAWINGS

FIG. 1 is a schematic view and block diagram of an embodiment of the present invention;

DESCRIPTION OF THE PREFERRED EMBODIMENTS

Figure 2:
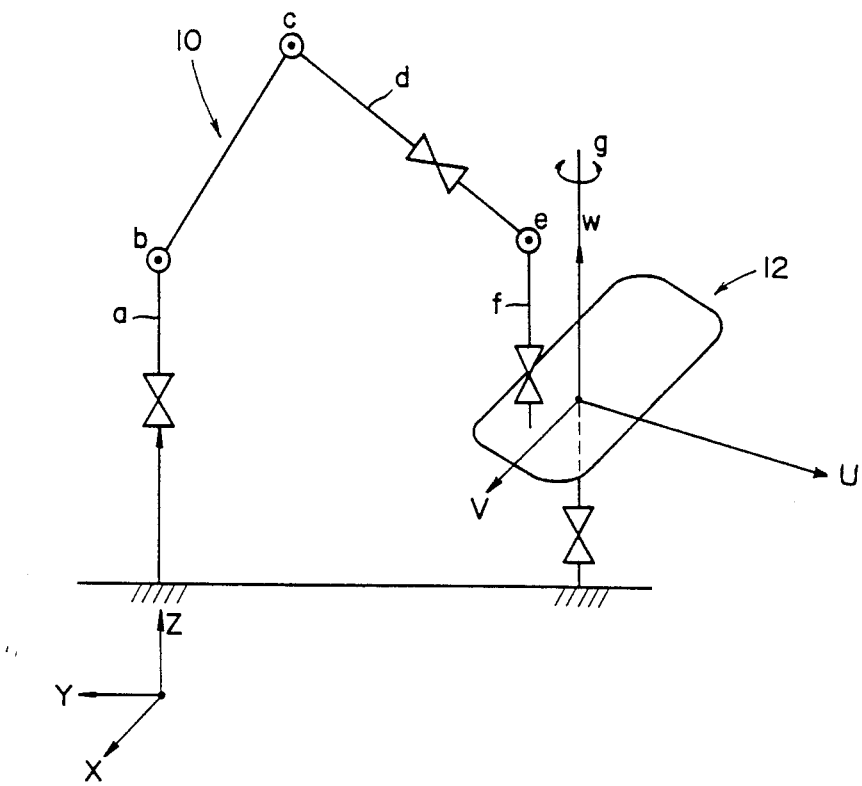
FIG. 2 is a view of a model pattern of relative movement of the robot and rotary table in FIG. 1.

In order that the invention and its various preferred features may be understood more easily, specific embodiments will now be described in detail with reference to the drawings.

FIG. 1 is a schematic view and block diagram of one embodiment in accordance with the present invention. In the figure, reference numeral 10 indicates a six-axis articulated robot comprising a swivel base 10a having a longitudinal axis, articulated arm members 10b, 10c, and an articulated hand portion 18. Reference numeral 12 indicates a rotary table rotating in synchronization with the robot 10. The robot 10 is constructed such that it may execute rotational movement about each axis a, b, c, d, e and f as shown by the arrows. The orientation of the robot is determined by the rotational orientation of the robot axes a–f referred to herein as the joint angles of the robot 10. On the upper portion of the rotating table 12 is mounted a jig 14 for holding a workpiece 16, such as a window glass of an automobile, on the rotary table 12. the hand portion 18 of the robot 10 applies sealant, applies paints, deburrs, polishes, emplaces rubber elements, and engages in other operations on the workpiece 16, i.e., the hand portion 18 operates as an end-effector.

The rotary table 12 comprises a rotational shaft having a longitudinal axis g about which the rotational shaft rotates. The amount of rotational movement is controlled by a driving signal delivered from a control circuit 20. The rotational position of the rotary table 12 is monitored by an encoded mounted on the rotational shaft of the rotary table 12. The detected output is fed back to the control circuit to control the position. On the other hand, the amount of rotation in each axis (a–f) of the robot 10 is controlled by a driving signal from the control circuit 20. The rotational position is also detected by an encoder and a potentiometer for feedback to the control circuit.

FIG. 2 shows a model pattern of the function of the robot 10 and the rotary table 12 of FIG. 1. For the absolute orthogonal (XYZ) coordinate system of the robot 10, the a-axis (axis of swivel base 10a) is taken as the Z-axis. The X-axis and Y-axis are set perpendicular to the Z-axis and to one another. One the other hand, the rotational shaft of the rotary table 12 is taken as the W-axis and a U-axis and V-axis are set perpendicular to the W-axis and to one another to form a rotary table (UVW) orthogonal coordinate system. In accordance with the present invention, teaching is executed using this rotary table orthogonal coordinate system.

In operation, the hand portion 18 of the robot moves in the U-W plane of the rotary table orthogonal coordinate system.

Figure 3:
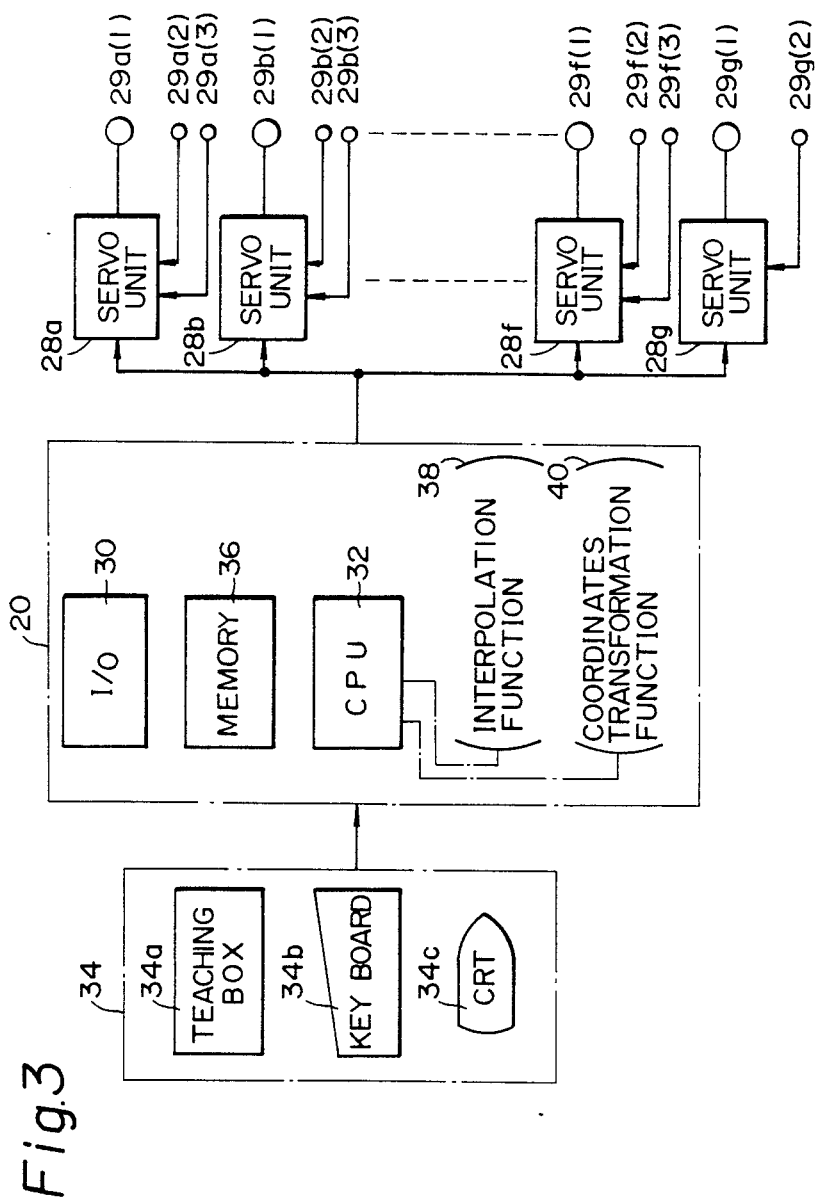
FIG. 3 is a block diagram of the control circuit in FIG. 1.
Figure 4:
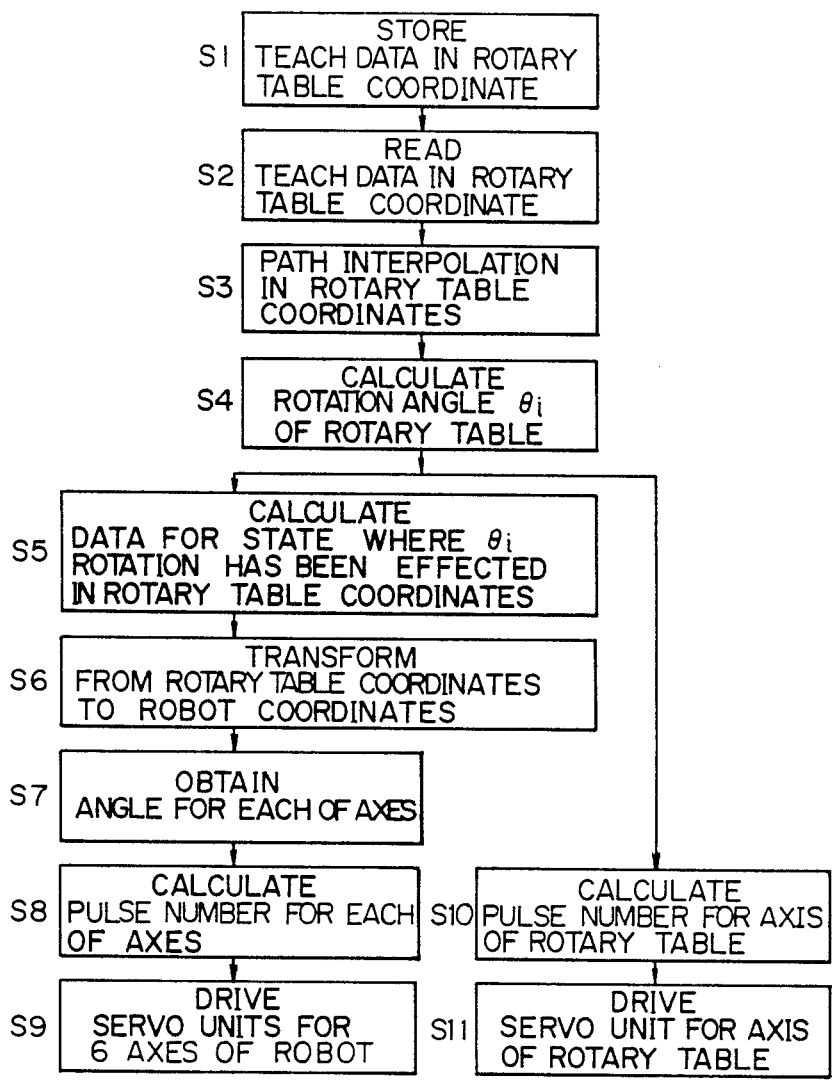
FIG. 4 is a flow chart of the operation process.

FIG. 3 is a block diagram of an example of the control circuit of FIG. 1. In the figure, reference numerals 29a(1), 29b(1), ..., 29f(1) are servomotors for the respective axes (a–f) of the robot 10. Reference numeral 29g(1) is a servomotor for the rotational shaft of the rotary table 12. On each axis, encoders 29a(2), 29b(2), ..., 29f(2), 29g(2) and potentiometers 29a(3), 29b(3), ..., 29f(3), are set to detect the position of rotation about each axis a–f and g, as affected by movement caused by each servomotor. Each distinct driving pulse is applied to each servomotor 29a(1), 29b(1), ..., 29f(1), 29g(1) from each servo unit 28a, 28b, ..., 28f, 28g. On the other hand, each piece of information regarding the position of rotation about any of the axes a–f and g, as detected by the respective encoders is sent to each servo unit 28a, 28b, ..., 28f, 28g from each encoder 29a(2), 29b(2), ..., 29f(2), 29g(2) and each potentiometer 29a(3), 29b(3), ..., 29f(3). Each servo unit 28a, 28b, ..., 28f, 28g controls the rotational position of each axis a–f and g in response to each indicated value sent from a central processing unit (CPU) 32 or microcomputer 32 through an input/output (I/O) port 30.

Each potentiometer 29a(3), 29b(3), ..., 29f(3) detects the rough position of rotational movement of each axis, while each encoder 29a(2), 29b(2), ..., 29f(2), 29g(2) detects the precise position of rotational movement. FIG. 3 shows a console 34 to input and/or output the data from the operation side. The console 34 is composed of a teaching box 34a, a keyboard 34b, and a cathode ray tube (CRT) display 34c. FIG. 3 also shows a memory 36 which stores the input data, teaching data, and so on from the console 34, an interpolating device 38 for conducting "path interpolation", described below, and a coordinate transformation device 40 for determining the locations interpolation points will occupy after rotation of the rotary table and for transforming the coordinates of these locations from the rotary table (UVW) orthogonal coordinate system to the robot absolute (XYZ) orthogonal coordinate system and to joint angles of the robot 10.

The operation of the system will now be explained with reference to FIG. 1.

The teaching operation is performed with the rotary table 12 not rotating but kept fixed at a predetermined position. An operator moves the hand portion 18 of the robot 10 to teach at least two points, thereby obtaining the rotational orientation of each axis a–f of the robot 10 and the attitude of the hand portion 18 for each point taught, as well as the coordinates of each taught point in the absolute orthogonal coordinate system (XYZ axes). Alternatively, the teaching operation may be performed by inputting the joint angles, the XYZ coordinates or the UVW coordinates of at least two points.

Using the robot orthogonal (XYZ) coordinate system and the rotary table orthogonal (UVW) coordinate system and representing position and attitude data as a matrix $M_r(H)$, the following equation can be obtained.

$$M_r(H) = \begin{pmatrix} N(X) & O(X) & A(X) & X \\ N(Y) & O(Y) & A(Y) & Y \\ N(Z) & O(Z) & A(Z) & Z \\ 0 & 0 & 0 & 1 \end{pmatrix} \quad (1)$$

where X, Y, and Z denote the positional data of the hand; N(X), N(Y), and N(Z) normal vector; O(X), O(Y), and O(Z) orientation vector; and A(X), A(Y), and A(Z) approach vector.

As shown in FIG. 1 and FIG. 2, when the transformation matrix from the rotary table orthogonal coordinate system (U, V, W) to the robot absolute orthogonal coordinate system (X, Y, Z) is taken as T and the inverse matrix of the above-mentioned transformation matrix is taken as $T^{-1}$, the position and attitude data $M_t(H)$ in the rotary table (UVW) orthogonal coordinate system is represented by the following equation (2). The position and attitude data of the robot absolute (XYZ) orthogonal coordinate system obtained by the teaching data are transformed to position and attitude data in the rotary table orthogonal (UVW) coordinate system and then stored in the memory 36 as the teaching data. Therefore, when a matrix of the robot coordinate system is represented as $M_r(H)$ and a matrix of the rotary table coordinate system as $M_t(H)$, then $$M_t(H) = T^- \cdot M_r(H) \quad (2)$$

Figure 5:
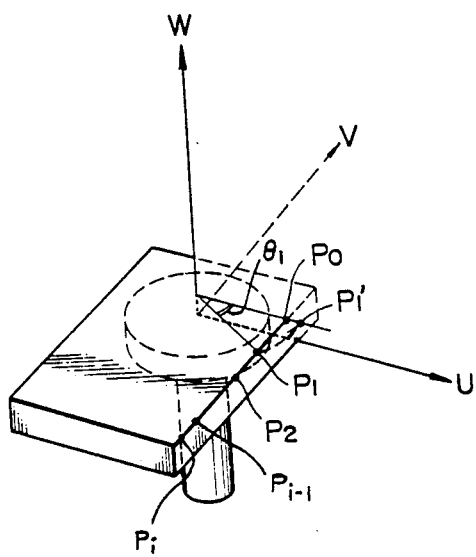
FIG. 5 is a diagram of a rotary table system showing defined lines and point used to explain the interpolation and coordinate transformation functions in accordance with the present invention.

The first step in the playback operation is referred to herein as "path interpolation". Two "taught" points are selected as $P_O$ and $P_i$. The UVW coordinates of a plurality of points evenly spaced along a line segment connecting $P_o$ and $P_i$ are calculated. To assist in understanding the computational algorithm for the "path interpolation" step, reference is made to FIG. 5. The UVW coordinates of the points, $P_O$, $P_i$ have been previously stored in the system as a result of the teaching operation. Points $P_O$, $P_i$ define an interpolation line segment. The system determines the UVW coordinates of a plurality of "interpolation" points $P_1$, $P_2$, $P_3$ . . . , $P_{i-1}$ positioned such that the points $P_1$–$P_i$ are evenly spaced on the interpolation line segment. For each interpolation point, the angle $\theta$ (calculated as described below) between the U-W plane and a plane which includes the W axis and the interpolation point is determined, the angles being referred to as interpolation angles $\theta_o$–$\theta_i$ respectively corresponding to the interpolation points $P_o$–$P_i$. The periods of time required for the table to rotate each of $\theta_o$, $\theta_1$. . . $\theta_i$ degrees are determined based on information received from the encoder $29g(2)$ (typically, the table rotates at a fixed rate so $\Delta\theta$ equals the product of elapsed time ($\Delta t$-preferably on the order of tens of milliseconds) and a constant). A U-W plane interpolation position ($P_o{}'$–$P_i{}'$) is determined for each interpolation point, the U-W plane interpolation positions being the UVW coordinates of the respective positions that the interpolation points $P_o$–$P_i$ will occupy when passing through the U-W plane. The UVW coordinates for each of the interpolation points $P_O$–$P_i$ are converted into XYZ coordinates and then into rotational orientation information for each of the axes (a–f) of the robot. The robot is controlled through rotational movement about any of its axes (a–f) in response to information derived as discussed above. Thus, the robot system operates in response to learned and generated information as to, inter alia, (1) when each of the interpolation points $P_O$–$P_i$ will pass through the plane in which the hand portion 18 of the robot 10 operates *and* (2) the rotational orientation relative to each axis (a–f) of the robot that will bring the hand portion 18 of the robot to the positions that each interpolation point ($P_O$–$P_i$) occupies when passing through the U-W plane.

The interpolation angle $\theta$ for each interpolation point $P_O$, $P_1$ . . . $P_i$ is calculated as follows:

$$\theta_i = -\tan^{-1}\frac{P_{iV}}{P_{iU}} \quad (3)$$

where $P_{iU}$ is a U-component of the interpolation point $P_i$ on the rotary table coordinate system and $P_{iV}$ is a V-component of the interpolation point $P_i$ on the rotary table coordinate system.

When this interpolation point $P_i$ reaches the U-W plane of the rotary table (UVW) orthogonal coordinate system, the interpolation point $P_i$ has rotated by $\theta_i$ around the W-axis of the rotary table coordinate system. This will be explained more concretely using FIG. 5. The rotational angle $\theta_1$ for the interpolation point $P_1$ is obtained from the above-mentioned equation (3). When the table has rotated by an angle $\theta_1$, the interpolation point $P_1$ will be at the position $P_1{}'$. The matrix of the point $P_1{}'$ is calculated by the following equation.

$$M_r(P_1') = \begin{pmatrix} \cos\theta_1 & \sin\theta_1 & 0 & 0 \\ -\sin\theta_1 & \cos\theta_1 & 0 & 0 \\ 0 & 0 & 1 & 0 \\ 0 & 0 & 0 & 1 \end{pmatrix} \cdot M_r(P_1) \quad (5)$$

Using the above-described transformation matrix T, the U-W plane interpolation positions are converted into coordinates in the absolute (XYZ) coordinate system of the robot 10. Taking the interpolation point on the robot absolute coordinate system as $T_O$, the following equation is obtained.

$$M_r(P_1') = T \cdot M_r(P_1') \quad (6)$$

This $M_r(P_1')$ is transformed into information concerning the angles of each axis of the robot 10 corresponding to the thus derived XYZ coordinates of the interpolation position, matched with the number of pulses of the encoders of each axis, and the servo-motors $29a(1)$, $29b(1)$, . . . , $29f(1)$ are driven for movement of the hand of the robot to the position occupied by the interpolation point $P_1$ when it is in the U-W plane.

On the other hand, as for the rotary table 12, the number of pulses of the encoder corresponding to $\theta_1$ is calculated and the servomotor $29g(1)$ is driven whereupon the rotary table 12 rotates by $\theta_1$. Therefore, the hand of the robot 10 and the workpiece 16 of the rotary table 12 meet at the point $P_1'$ which is reached by the rotation of an angle $\theta_1$ with respect to the W-axis from point $P_1$. In the same way, the above-described computation is effected for the other interpolation points $P_2$, $P_3$, . . . $P_i$ in real time. Each successive interpolation point is rotated to a point projected on the U-axis of the rotary table coordinate system each successive $\Delta t$ (preferably on the order of tens of milliseconds, as discussed above), and the UVW coordinates of each U-W plane interpolation position are transformed to the robot absolute (XYZ) orthogonal coordinate system. The rotary table 12 is rotated at a fixed rate, such that at each $\Delta t$, successive interpolation points reach their respective U-W plane interpolation positions.

As is apparent from the above-described explanation, the hand of the robot 10 in the embodiment shown in FIG. 2 executes only two-dimensional movement in the U-W plane. As $\Delta t$ is an extremely short time, such as several tens of milliseconds, the command values of the interpolation points, which are successively output enable the robot 10 and the rotary table 12 to be controlled continuously in perfect synchronization.

As described above, the robot apparatus of the above embodiments stores teaching data as values of the rotary table coordinate system and seeks each interpolation point by linear interpolation on the rotary table coordinate system. Therefore, the interpolation during playback becomes much more simple and precise.

Since the robot apparatus of the present invention uses linear interpolation for path interpolation, computations are easier in comparison with circular arc interpolation and the like. As the path between two points is linear, an operator can easily infer how the hand of the robot moves in the U-W plane during playback. Consequently, teaching becomes simple and the safety of the apparatus as a whole can be more easily ensured.

The robot apparatus of the present invention is designed so that neither the robot nor the rotary table have to move linearly, replacing this with movement of the robot hand in the U-W plane. Thus, the conventional problems of the larger size of the apparatus resulting from the provision of travelling means for linear movement of the robot or rotary table, the difficulty of maintenance of precision, and the need for a large space and adjustment of the relative position of peripheral equipment are eliminated.

Further, as the interpolation points are calculated in real time during playback, only 1/15 of the data in the case of computing the interpolation points in advance need be stored in the memory 36.

Furthermore, linear interpolation enables a shorter computation time, and it is not necessary to prolong the real-time computation time drastically, so that the sampling time can be kept to less than several tens of milliseconds. This eliminates the deterioration in precision resulting from prolongation of the sampling time.

Still further, as the robot hand may be moved only in two dimensions, i.e., the U-W plane shown in the figures, it is much easier to supply slender, continuous members in attaching such members around the workpiece.

It should be noted that while the above-described embodiment was explained in reference to linear interpolation used for path interpolation, curve interpolation or a combination of linear and curve interpolation may also be adopted depending upon the particular purpose.

We claim:

1. A system for operating on a workpiece comprising:
a rotary table which rotates about a rotary table axis, the rotary table having a surface which supports a workpiece;
a plural-axis-articulated robot having a hand portion for performing operations on said workpiece; and
a control circuit which controls movement of said robot and of said rotary table, said control circuit comprising (a) memory means for storing teaching data points as coordinates for at least two points in a UVW orthogonal coordinate system having a U axis, a V axis and a W axis which define a U-V plane, a V-W plane and a U-W plane, the UVW orthogonal coordinate system being defined such that said rotary table axis is along said W axis, (b) interpolation means for deriving the coordinates in said UVW orthogonal coordinate system of a plurality of interpolation points located on an interpolation line segment having as endpoints two of said teaching data points, said interpolation points being spaced along said interpolation line segment; and (c) transformation means for (1) determining an interpolation angle for each interpolation point, said interpolation angle being the angle by which said rotary table must be rotated to bring the interpolation point into said U-W plane; (2) determining for each interpolation point the time at which the interpolation point will be in said U-W plane; (3) determining U-W plane interpolation positions, the U-W plane interpolation positions comprising the UVW coordinates of the positions in said U-W plane through which the interpolation points will pass when said rotary table has rotated corresponding interpolation angles; and (4) controlling movement of said robot and said rotary table in response to information thus derived as to the UW plane interpolation positions and as to when each interpolation point will be in the respective U-W plane interpolation position.

2. A system as claimed in claim 1 wherein said teaching data points define a curve.

3. A system as claimed in claim 1 wherein said teaching data points define a line segment.

4. A system as claimed in claim 1, further comprising a jig mounted on said rotary table for fixing said workpiece thereon.

5. A system claimed in claim 1, further comprising an encoder and a potentiometer mounted on a rotational shaft about which the rotary table rotates to monitor the position of the rotary table.

6. A system as claimed in claim 1 wherein said robot comprises a plurality of articulated arm members each coupled to one another at a joint angle, and an articulated hand member coupled to one of said plurality of articulated arm members, said robot being adapted for rotational movement about a plurality of axes defined by the rotational orientations about said joint axes of said articulated arm members and said articulated hand member.

7. A system as claimed in claim 4, further comprising a joint angle transformation means for transforming joint angles of said robot into coordinates in a robot-assigned (XYZ) orthogonal coordinate system and into coordinates in said UVW orthogonal coordinate system.

8. A system as claimed in claim 7, further comprising XYZ transformation means for transforming the UVW coordinates of the U-W plane interpolation positions into XYZ coordinates.

9. A system as claimed in claim 7, further comprising calculation means for calculating a set of joint angles corresponding to coordinates in the XYZ coordinate system.

10. A system as claimed in claim 7 wherein said robot includes six joint angles.

11. A system for operating on a workpiece comprising:
a rotary table which rotates about a rotary table axis, the rotary table having a surface which supports a workpiece;
a plural-axis-articulated robot having a hand portion for performing operations on said workpiece; and
a control circuit which controls movement of said robot and of said rotary table, said control circuit comprising (a) memory means for storing teaching data points as coordinates for at least two points in a UVW orthogonal coordinate system having a U axis, a V axis and a W axis which define a U-V plane, a V-W plane and a U-W plane, the UVW orthogonal coordinate system being defined such that said rotary table axis is along said W axis, (b) interpolation means for deriving the coordinates in said UVW orthogonal coordinate system of a plurality of interpolation points located on an interpolation curve defined by said teaching data points, said interpolation points being spaced along said interpolation line segment; and (c) transformation means for (1) determining an interpolation angle for each interpolation point, said interpolation angle being the angle by which said rotary table must be rotated to bring the interpolation point into said U-W plane; (2) determining for each interpolation point the time at which the interpolation point will be in said U-W plane; (3) determining U-W plane interpolation positions, the U-W plane interpolation positions comprising the UVW coordinates of the positions in said U-W plane through which the interpolation points will pass when said rotary table has rotated corresponding interpolation angles; and (4) controlling movement of said robot and said rotary table in response to information thus derived as to the U-W plane interpolation positions and as to when each interpolation point will be in the respective U-W plane interpolation position.

* * * * *